(12) United States Patent
Stinnett

(10) Patent No.: US 6,527,246 B1
(45) Date of Patent: Mar. 4, 2003

(54) POSITIONING AND ANTI-MOVEMENT SUPPORT STAKE INCLUDING MARKING MEANS FOR UNDERGROUND PIPES

(76) Inventor: Thomas M. Stinnett, 108 Blancett Lake Rd., Hardinsburg, KY (US) 40143

( * ) Notice: Subject to any disclaimer, the term of this patent is extended or adjusted under 35 U.S.C. 154(b) by 0 days.

(21) Appl. No.: 09/477,320

(22) Filed: Jan. 4, 2000

(51) Int. Cl.[7] .............................................. F16M 13/00
(52) U.S. Cl. ......................... 248/545; 248/85; 248/87; 248/530
(58) Field of Search ........................... 248/545, 85, 87, 248/530, 56, 156, 508, 507; 405/157

(56) References Cited

U.S. PATENT DOCUMENTS

| | | | |
|---|---|---|---|
| 3,568,455 A | | 3/1971 | McLaughlin et al. |
| 3,797,260 A | * | 3/1974 | Webb .......................... 405/172 |
| 3,941,342 A | * | 3/1976 | Bradshaw ..................... 248/88 |
| 4,043,139 A | * | 8/1977 | Scott ......................... 405/184.4 |
| 4,126,012 A | | 11/1978 | Waller |
| 4,440,370 A | * | 4/1984 | Rood .......................... 248/75 |
| 4,492,493 A | * | 1/1985 | Webb .......................... 405/172 |
| 4,621,783 A | * | 11/1986 | Wier .......................... 248/245 |
| 4,623,282 A | | 11/1986 | Allen |
| 4,767,237 A | | 8/1988 | Cosman et al. |
| 4,826,111 A | | 5/1989 | Ismert |
| 4,979,462 A | | 12/1990 | Kramer et al. |
| 5,007,768 A | | 4/1991 | Waller |
| 5,242,247 A | | 9/1993 | Murphy |
| 5,294,083 A | * | 3/1994 | Roth .......................... 248/146 |
| 5,375,801 A | * | 12/1994 | Porter ......................... 248/156 |
| 5,396,743 A | * | 3/1995 | Bellette ........................ 52/154 |
| 5,437,424 A | * | 8/1995 | Netz, Sr. ....................... 248/48 |
| D377,308 S | * | 1/1997 | McNamara et al. .......... D8/370 |
| 5,752,679 A | | 5/1998 | Thomason |
| 5,887,834 A | * | 3/1999 | Gellos et al. ................ 248/156 |
| 6,250,847 B1 | * | 6/2001 | Bingham, Jr. ................ 405/154 |

* cited by examiner

Primary Examiner—Ramon O. Ramirez
Assistant Examiner—Holly N. Sy
(74) Attorney, Agent, or Firm—James C. Eaves, Jr.; Karen L. Lynd; Greenebaum Doll & McDonald PLLC

(57) ABSTRACT

An apparatus for firmly positioning in a trench and securing against movement, while fill is added to the trench, an underground utility pipe and means for marking the utility pipe. An underground positioning and anti-movement apparatus in the form of an underground stake adapted to be driven into a base fill, that includes an integral preferably curvilinear-shaped pipe engaging member which engages the outer surface of an underground pipe to secure the pipe in position above the base fill at the bottom of the trench while additional fill is added to the trench. Also, at least one integral receptacle is located longitudinally on the stake body above the pipe engaging member which receives, supports and secures tracer wire, caution tape, or other marking means used to facilitate identification and location of the secured underground pipe and which allows placement of the marking means at a location above the pipe before the trench is filled so that the trench may be filled without disturbing the position of the marking means in relation to the secured pipe and without having to lay the pipe and marking means at different stages in the fill process. The current invention may also include an integral anti-removal member which extends from the bottom of the stake, compresses when pressed into the underlying supporting base fill, and expands and scoops up base fill to impede movement of the stake when an upward force is applied to the stake body.

23 Claims, 10 Drawing Sheets

POSITIONING AND ANTI-MOVEMENT SUPPORT STAKE INCLUDING MARKING MEANS FOR UNDERGROUND PIPES

BACKGROUND OF THE INVENTION (a) Field of the Invention

The present invention relates to an apparatus for firmly positioning an underground utility pipe in a trench and securing the pipe against movement while fill is added to the trench. The apparatus includes means for marking the utility pipe. More particularly, the present invention relates to an underground positioning and anti-movement apparatus in the form of an underground stake adapted to be driven into base fill in the bottom of a trench, that includes an integral preferably curvilinear-shaped pipe engaging member which engages the outer surface of an underground pipe to secure the pipe in position above or against the base fill at the bottom of a trench while additional fill is added to the trench. The present invention also includes at least one integral receptacle located longitudinally on the stake body above the pipe engaging member which receives, supports and secures tracer wire, caution tape, or other marking means used to facilitate identification and location of the secured underground pipe and which allows placement of the marking means at a location above the pipe before the trench is filled so that the trench may be filled without disturbing the position of the marking means in relation to the secured pipe and without having to lay the pipe and marking means at different stages in the fill process. The current invention may also include an integral anti-removal member which extends from the bottom of the stake, compresses when pressed into the underlying supporting base fill, and expands and scoops up base fill to impede movement of the stake when upward force is applied to the stake body.

(b) Description of the Prior Art

U.S. Pat. No. 3,568,455, to R. E. McLaughlin et al., teaches an underground pipe hanger that includes a steel spike that is removably mounted in a bed of particle material and which slidably carries a bracket plate, held in position relative to the stake by means of a setscrew, having a cutout portion capable of accommodating pipes of different diameters and a cable, removably attached to the bracket plate to support the lower circumference of the pipe.

U.S. Pat. No. 4,126,012, to Waller, teaches an underground pipe hanger of a unitary structure that includes a lower stake portion with opposed, rigid upwardly diverging barbs which is driven into the solid, unexcavated ground below the fill dirt at the base of a trench. The upper stake portion carries a pair of laterally extending arms that are integrally formed with the stake to support a pipe of predetermined diameter.

U.S. Pat. No. 4,826,111, to Ismert, teaches a pipe anchor with a spike portion used to secure a pipe to the ground prior to pouring concrete and a body portion with a bottom edge consisting of a plurality of relatively straight edge segments which provide a concave recess for fitting over and retaining pipes of different diameters.

U.S. Pat. No. 5,007,768, to Waller, teaches a pipe anchoring structure that includes a stake portion with fixed laterally extending wing members on the anchor portion of the stake that is driven into undisturbed earth and which carries up to two adjustable clamping members capable of securing in position pipes of different diameters, which are attached to the stake portion by a securing means after the clamping members have been attached to the positioned pipe.

SUMMARY OF THE INVENTION

The present invention relates to a stake for positioning and securing against movement an underground pipe and means for marking that pipe's location in a trench while fill dirt is added to the trench. Maintaining the pipe and its markers in desired positions in a trench while fill is added around and above the pipe and its markers has been problematic. This invention provides a convenient, fast and simple apparatus for securing the pipe in position in the trench. The use of a plurality of stakes of the invention in series solves the problem of positioning and maintaining the pipe and its spaced markers at the desired depth, level and position before and during backfilling of the trench.

When a pipe is buried in a trench it is useful to mark the location of the pipe within the trench in order to locate and avoid damaging the pipe during excavation. It is usual to mark the pipe location with one or more means, such as a tracer wire or a caution tape. A tracer wire may be buried in proximity to a pipe in order to aid in location of the pipe when excavation is required. The tracer wire is a metallic wire whose position can be located by a metal detector, which will aid an excavator in finding the approximate location of the pipe, lying below and parallel to the tracer wire. Marking tapes, such as caution tapes, can also be buried parallel to and above the pipe to aid in visual identification and location of the pipe for service and maintenance. The presence of the marking tape functions to visually warn excavators of the location of the underground pipe, which is lying below and parallel to the marking tape. Such tapes are colored and printed with identifying or warning information. A limitation of the prior art is that the underground pipe must be positioned and fill dirt added and leveled in the trench before the marking means can be positioned on top of the fill in the partially filled trench. The present invention allows placement of a one or more marking means at a location above and parallel to the pipe before the trench is filled so that the pipe and marking means may be placed in position at the same stage in the installation process. The trench is then filled with loose fill dirt without disturbing the position of the pipe and marking means in relation to the secured pipe during the fill process.

The present invention provides distinct advantages over the prior art structures, in that it provides a strong, rigid member and receptacles to securely hold below ground level in a predetermined position relative to the base of a trench, a pipe and one or more marking means for locating or identifying the buried pipe. In addition, the invention may contain an anti-removal member designed for insertion and stability in loose, level, base fill at the bottom of the trench.

Base fill at the bottom of a trench is often not uniformly level along the length of the trench, making level installation of the pipe against the base fill problematic. In the preferred embodiment, the stake includes an integral curvilinear-shaped pipe engaging member which receives, engages, and supports the outer surface of an underground pipe to secure the pipe in position. One or more stakes are placed in position in the trench in an upright manner, and then the pipe is positioned and confined by and within each of the stake's pipe engaging members, at a level above the base fill. Two integral receptacles are located longitudinally on the stake body, the first being about six inches above the pipe engaging member and the second about six inches above the first. The first receptacle has a closed wall opening which receives and positions a tracer wire at a distance above the pipe engaging member. The tracer wire is threaded through the closed wall opening of the first receptacle of each stake.

Alternatively, a slot can be employed so that the wire does not require threading. The second receptacle, which is "C" shaped with a slot for inserting caution tape, supports and secures the caution tape at a distance spaced above the first receptacle. The caution tape is inserted through the slot in the second receptacle of each stake, wherein the tape is secured and supported by the C shaped receptacle. An integral anti-removal member, consisting of a multiplicity of hinged three-sided plane members, extends from the bottom of the stake. The anti-removal member's planes fold on hinges, thereby compressing when inserted into the underlying supporting base fill at the trench base and expanding to scoop up base fill and thereby minimize movement of the stake if an upward force is applied to the stake body during completion of the fill process. Lips extend at an upward angle from the top of each hinged plane of the anti-removal member to aid in filling the member with dirt as the member expands. The shapes of the planes and the orientation on the shaft of the anti-removal member can be varied to provide adequate clearance for the underground pipes during installation. An integral flange extends laterally from the bottom end of the stake body above the anti-removal member. The flange can be grasped for leverage while positioning the stake in the base fill. The flange can also be stepped down upon to seat the pipe engaging member firmly around the pipe and to push the compressed anti-removal member firmly into the loose fill.

Where the base fill in the bottom of the trench is level, the stake may be used to restrict the movement of the pipe, rather than to support the pipe. An alternate embodiment of the stake has a pipe-engaging member which is installed over the pipe and confines it against the base fill. An additional embodiment of the stake is constructed to be installed into the side of a trench at a level above the trench bottom, which allows the pipe to be positioned and supported in the trench without the use of base fill and in conjunction with other utilities.

The present invention comprises a stake, comprising a longitudinal shaft having a top end and a bottom end; a pipe engaging member extending laterally from said shaft at a location toward said bottom end; and at least one receptacle extending from said shaft at a location toward said top end and spaced from said pipe engaging member.

Even more particularly, the preferred embodiment of the present invention comprises a longitudinal shaft having a top end and a bottom end; a curvilinear-shaped pipe engaging member extending laterally from the shaft at a location toward the bottom end, with a first end having an arched shape, a second end having an inwardly arched shape, and a diameter which generally corresponds to a tube diameter of a tube shaped object restrained by said pipe engaging member; a first receptacle extending from the shaft at a location toward the top end and spaced from the pipe engaging member, where the first receptacle is a receiving member with a closed wall opening which extends from the shaft at a location between the pipe engaging member and a second receptacle; a second receptacle extending from the shaft, where the second receptacle is a roughly C shaped member with a slotted opening which extends from the shaft at a location above the pipe engaging member and the first receptacle; an anti-removal member extending at a location from the bottom end of the shaft, where the anti-removal member contains a multiplicity of hinged, three-sided, planes which have a bottom portion, a top side, a left side, and a right side, the bottom portion of the planes extending from the shaft, and the left side of each plane being hinged to the right side of another plane allowing the member to expand and contract in size upon movement of the hinged planes; an outwardly extending lip projecting from the top side of each plane of the anti-removal member at an angle of approximately forty-five degrees; and a flange extending laterally from the shaft at a location toward the bottom end.

DETAILED DESCRIPTION OF THE PREFERRED EMBODIMENT

Figure 1:
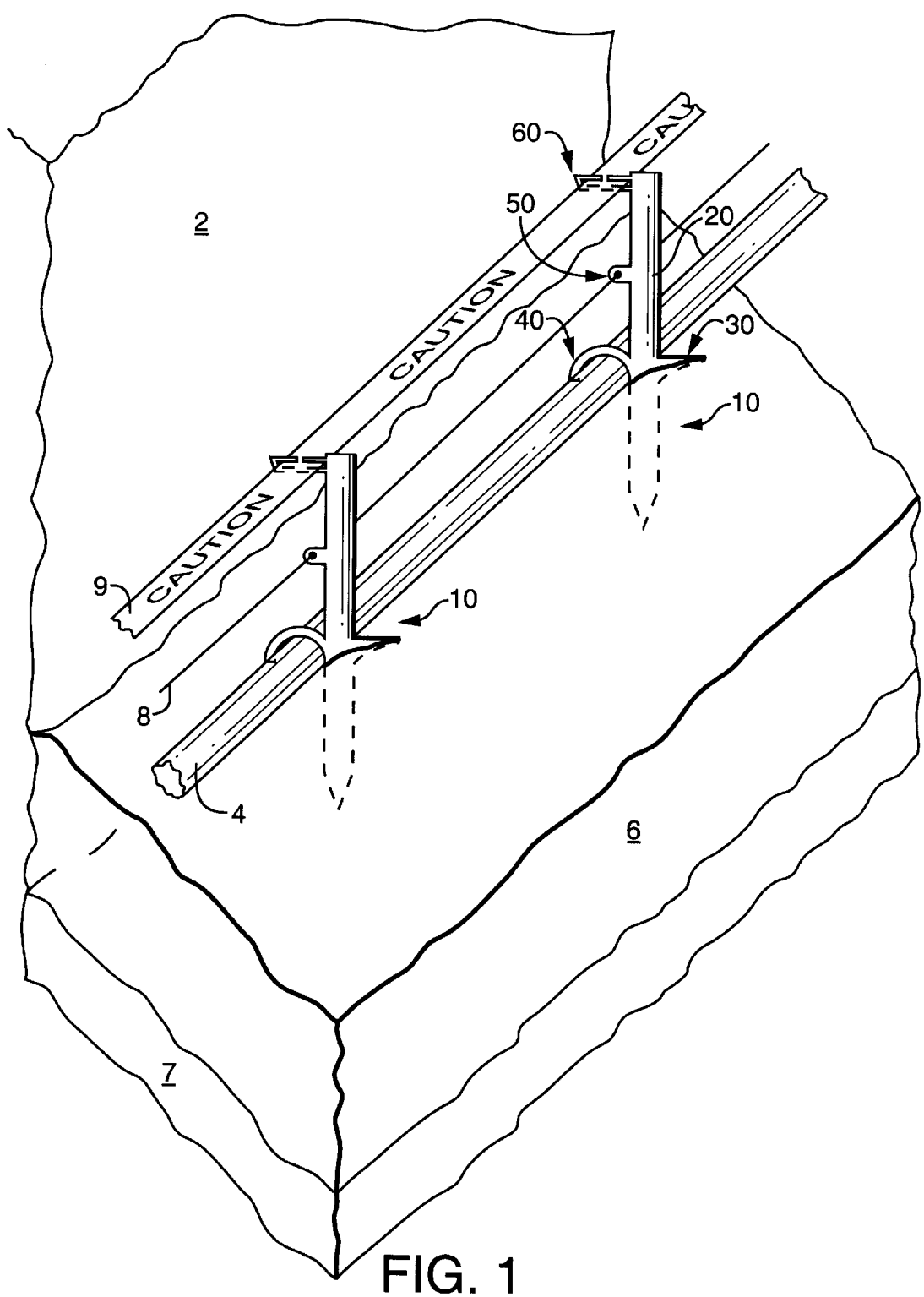
FIG. 1 is a perspective fragmentary view of a trench dug in hard ground containing a level sand fill base with a pipe laying on the surface of the sand fill base, the pipe being held in position by spaced stakes constructed in accordance with the present invention and installed in accordance with the present invention, and a tracer wire and a marking tape being supported and secured in position by said spaced stakes.

With reference to the Figures, FIG. 1 shows a trench 2 dug in hard ground 7 containing a level sand fill base 6 with a pipe 4 laying on the surface of the sand fill base 6, the pipe 4, for example, a flexible polyethylene gas line, being held in position by pipe engaging members 40 which extend laterally from the shafts 20 of two spaced stakes 10. A tracer wire 8 is supported and secured in position by first receptacles 50, and a marking or "caution" tape 9 is supported and secured in position by second receptacles 60, which extend laterally from the shafts 20 of the spaced stakes 10.

Figure 2:
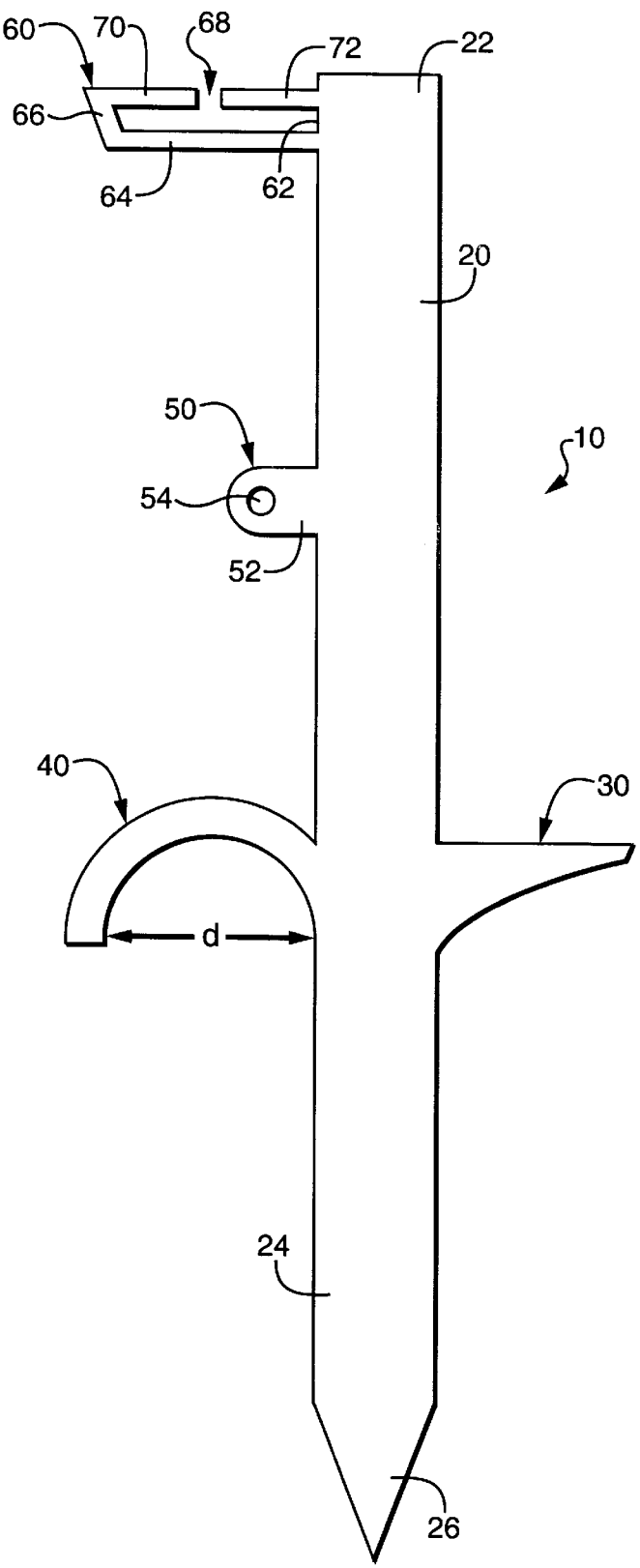
FIG. 2 is a side-elevational view of the stake disclosed in FIG. 1.

As seen in FIG. 2, the stake 10 has a longitudinal shaft 20 which has a top end 22, a bottom end 24, and a tapered point 26 extending from the bottom end 24. The tapered point 26 of the shaft 20 is designed to facilitate insertion of the bottom end 24 of the shaft 20 into the sand base fill 6 at the bottom of the trench 2. A pipe engaging member 40 extends laterally from the shaft 20 towards the bottom end 24 of the shaft 20 forming a pipe hold down hook. The pipe engaging member 40 has a preferred diameter "d" of approximately six inches or less to accommodate pipes with a similar or smaller diameter. An integral flange 30 extends laterally from the shaft 20 near the bottom end 24. The flange 30 can be grasped for leverage while positioning the stake 10 in the sand base fill 6. The flange 30 can also be pushed, stepped down upon, or driven to aid in seating the pipe engaging member 40 firmly around the pipe 4. A first receptacle 50 extends laterally from the shaft 20 near the top end 22 between the pipe engaging member 40 and a second receptacle 60 at a distance of approximately six inches from the pipe engaging member 40. The first receptacle 50, has a receiving member 52 with a closed wall opening 54. The first receptacle 50 is designed to receive a tracer wire 8 through and within the closed wall opening 54 contained in the receiving member 52. The tracer wire 8 aids in locating, before excavation, the pipe 4 lying below and parallel to the tracer wire 8. The second receptacle 60 extends from the shaft 20 above both the pipe engaging member 40 and the first receptacle 50, approximately six inches above the first receptacle 50. The second receptacle 60 is a roughly C shaped member with a bottom 62, a back 64, a top 66, a slotted opening 68, a first arm 70, and second arm 72. The second receptacle 60 can receive a caution tape 9 through the slotted opening 68. The bottom 62, back 64, top 66, first arm 70, and second arm 72 of the second receptacle 60 then support and secure the caution tape 9 at a distance spaced above the first receptacle 50. The presence of the caution tape 9 serves as a visual warning to excavators that the pipe 4 is lying below and parallel to the tape 9.

Figure 3:
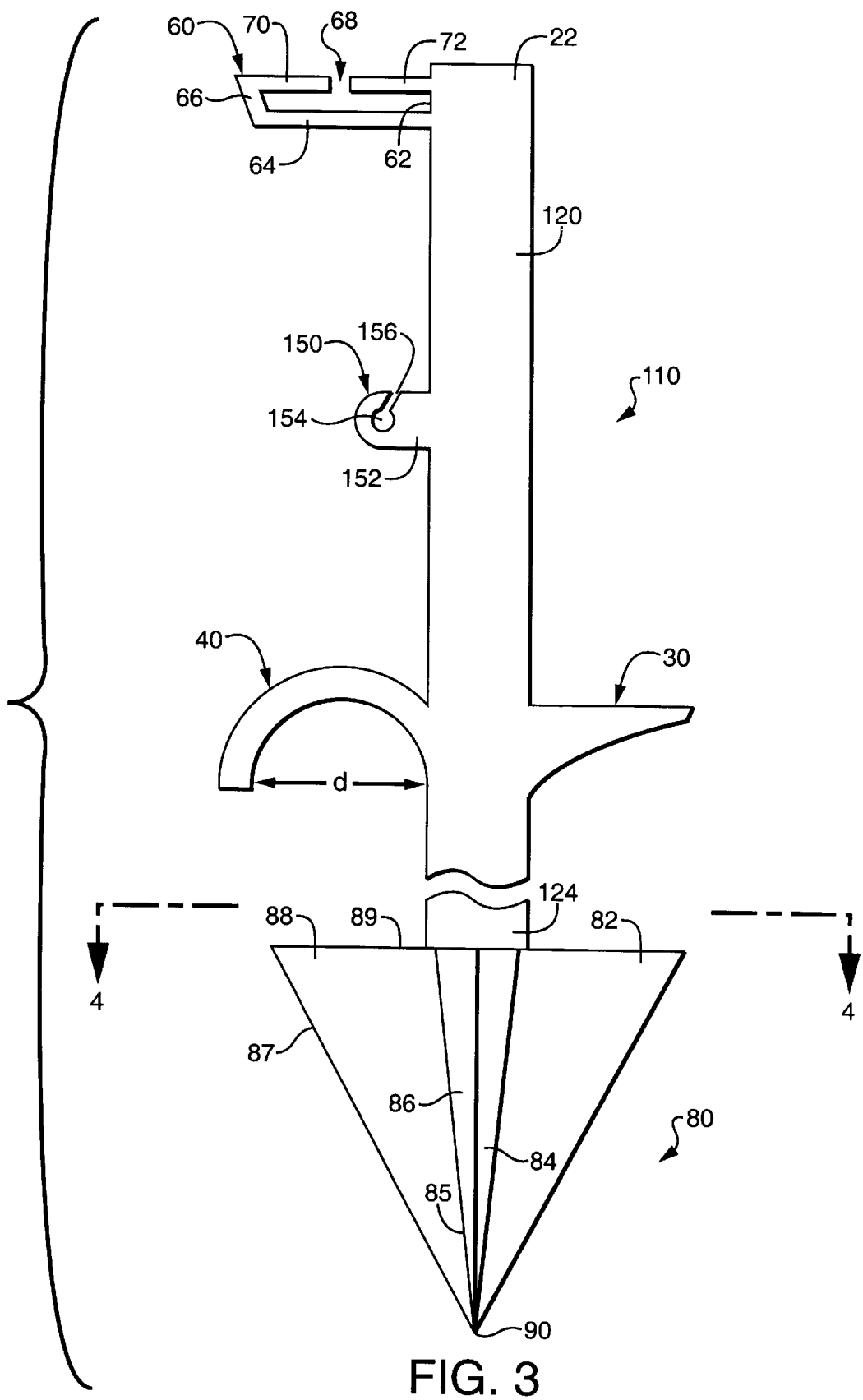
FIG. 3 a fragmentary side elevational view of a modified form of the stake of the present invention, where an anti-removal member extends from the shaft of the stake.
Figure 4:
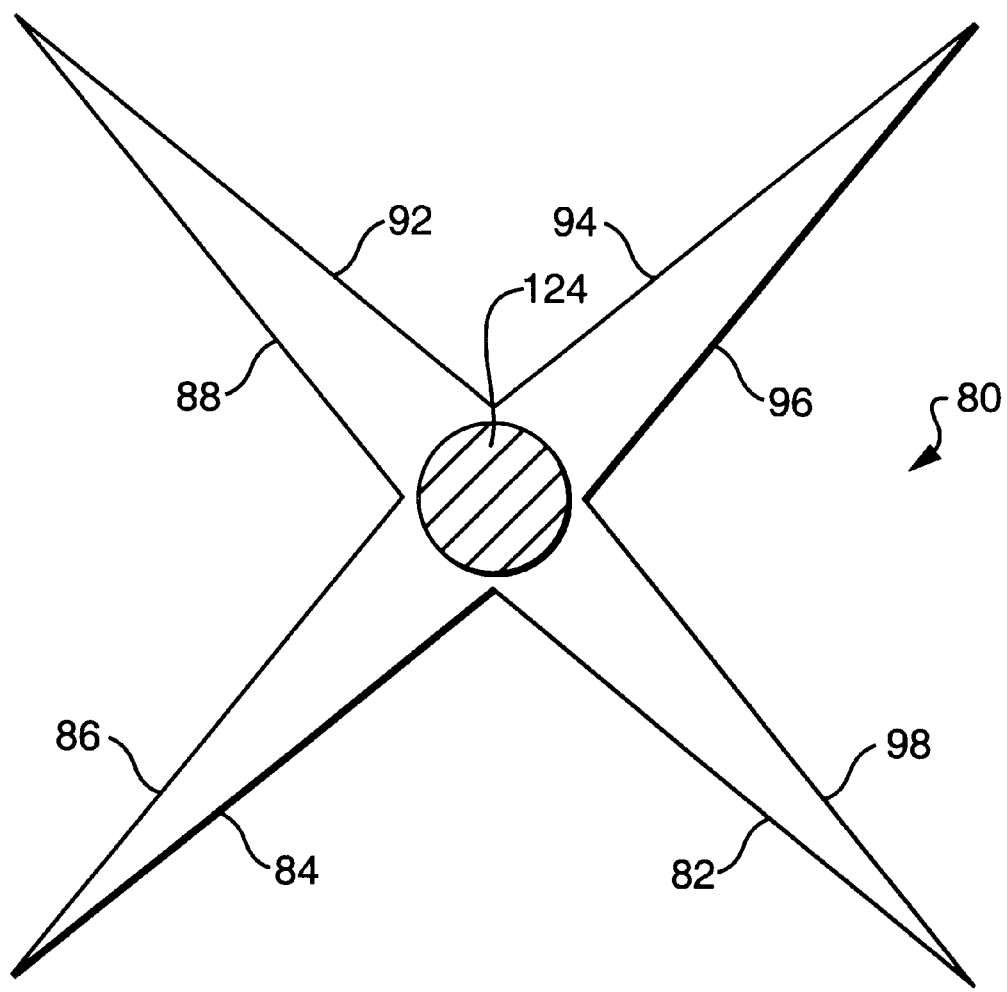
FIG. 4 is a cross-sectional top view of the stake taken along the line of 4—4 of FIG. 3, where the anti-removal is in a closed position.
Figure 5:
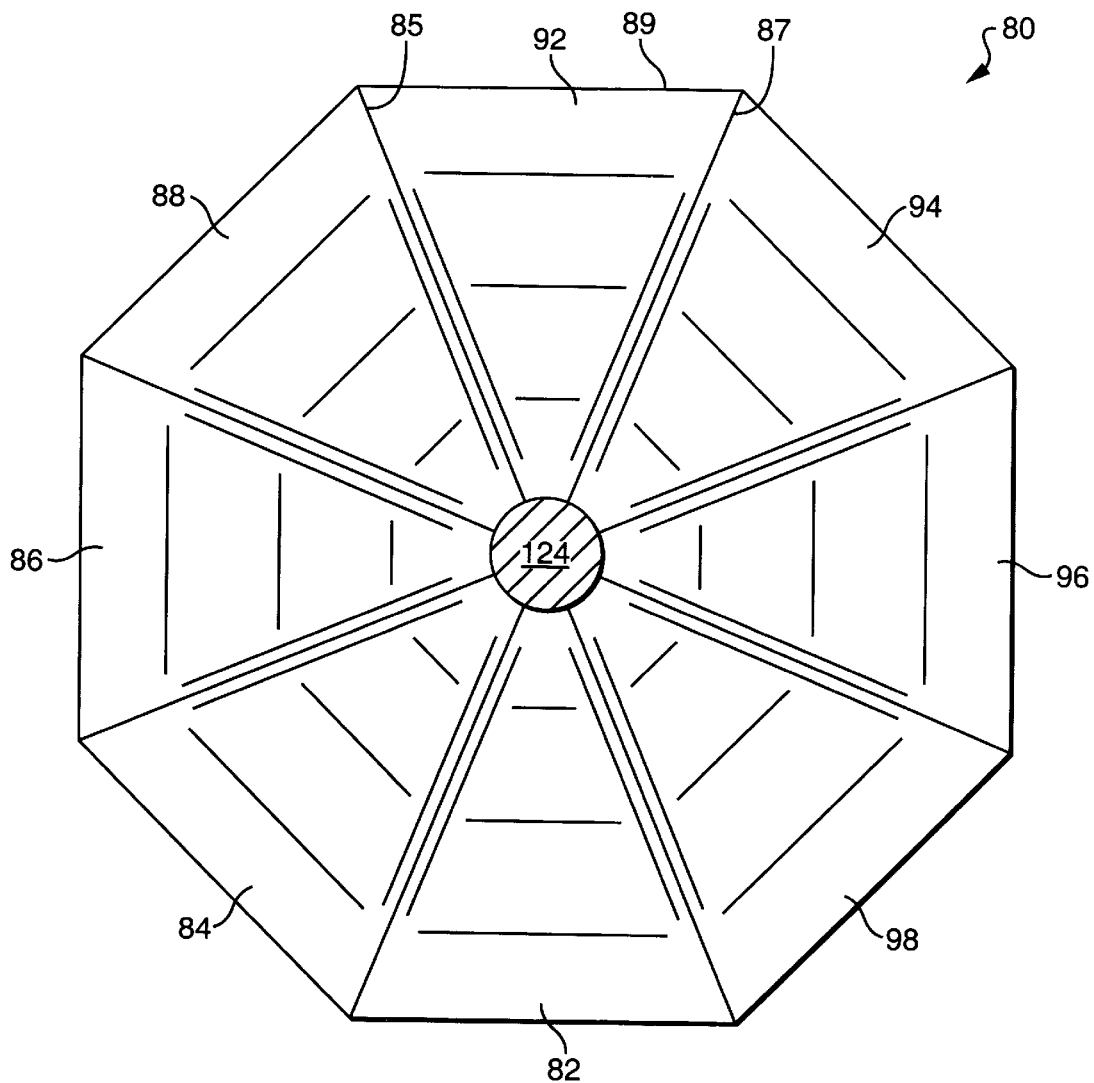
FIG. 5 is a cross-sectional top view of the stake taken along the line of 4—4 of FIG. 3, where the anti-remover is in an open position.

FIG. 3 demonstrates an alternate embodiment of the present invention. The stake 110 has a longitudinal shaft 120 which has a top end 22 and a bottom end 124. A pipe engaging member 40 extends laterally from the shaft 120 towards the bottom end 124 of the shaft 120. The pipe engaging member 40 has a diameter of approximately six inches or less to accommodate pipes 4 with a similar or smaller diameter. An integral flange 30 extends laterally from the shaft 120 near the bottom end 124. A first receptacle 150 extends laterally from the shaft 120 near the top end 22 at a distance of approximately six inches from the pipe engaging member 40. The first receptacle 150 has a receiving member 152 with an open wall opening 154, which extends laterally from said shaft 120 between the pipe engaging member 40 and a second receptacle 60. The first receptacle 150 is designed to receive a tracer wire 8 through and within the open wall opening 154 through slot 156 contained in the receiving member 152. The second receptacle 60 extends laterally from the shaft 120 above the pipe engaging member 40 and the first receptacle 150. The second receptacle 60 is a roughly C shaped member with a bottom 62, a back 64, a top 66, a slotted opening 68, a first arm 70, and a second arm 72. The second receptacle 60 can receive a caution tape 9 through the slotted opening 68. The bottom 62, back 64, top 66, first arm 70, and second arm 72 of the second receptacle 60 then support and secure the caution tape 9 at a distance spaced above the first receptacle 50. An integral anti-removal member 80, as shown in FIGS. 3–5, extends from the bottom end 124 of the shaft 120. The anti-removal member 80 contains a multiplicity of hinged, three-sided planes 82, 84, 86, 88, 92, 94, 96, 98, which each have a bottom portion 90, a top side 89, a left side 87, and a right side 85. The bottom portion 90 extends from the shaft 120, and the left side 87 of each plane 82, 84, 86, 88, 92, 94, 96, 98 is hinged to the right side 85 of another plane 82, 84, 86, 88, 92, 94, 96, 98. This design allows the anti-removal member 80 to expand and contract in size upon movement of the hinged planes 82, 84, 86, 88, 92, 94, 96, 98. The shapes of the planes 82, 84, 86, 88, 92, 94, 96, 98 and the orientation of the anti-removal member 80 on the bottom end 124 of the shaft 120 can be varied to provide adequate clearance for the underground pipes 4 during installation.

FIG. 4 shows a cross-sectional top view of the anti-removal member 80 with the planes 82, 84, 86, 88, 92, 94, 96, 98 folded together in a closed position on their hinges.

FIG. 5 shows a cross-sectional top view of anti-removal member 80 with the planes 82, 84, 86, 88, 92, 94, 96, 98 in an open position on their hinges.

Figure 6:
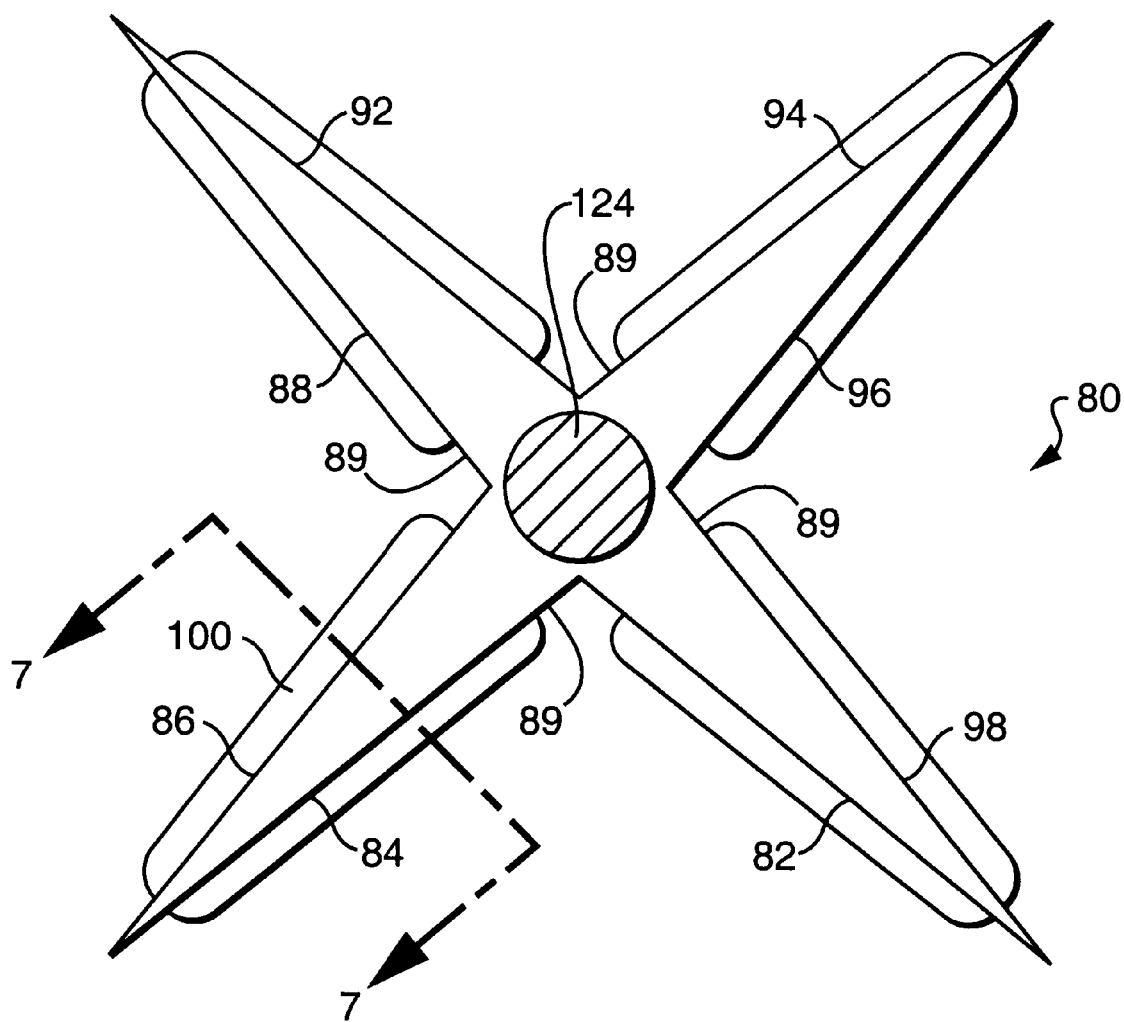
FIG. 6 is a cross-sectional top view of the stake and a modified form of the anti-removal member taken along the line of 4—4 of FIG. 3, where the anti-removal member is in a closed position as FIG. 4.
Figure 7:
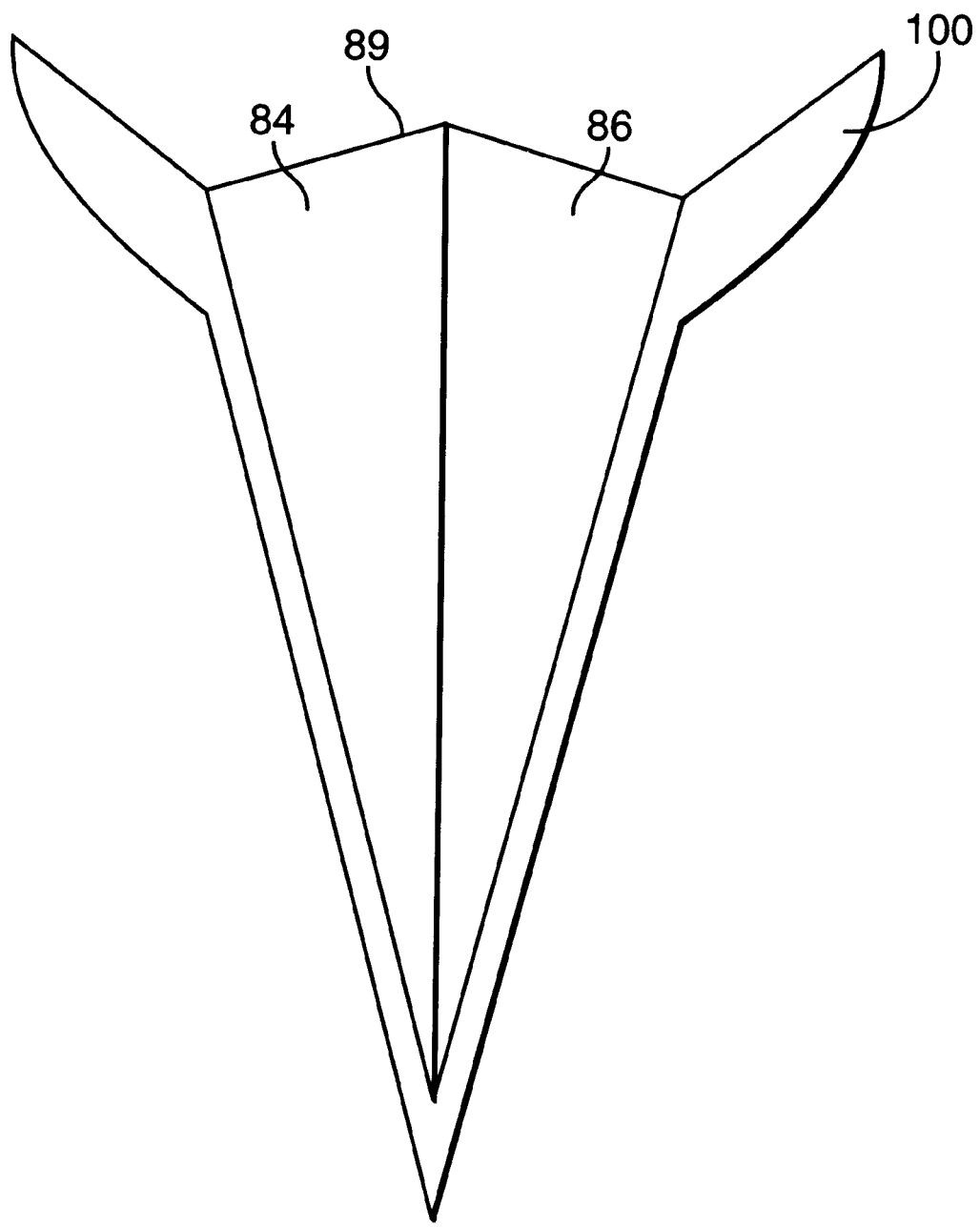
FIG. 7 is a cross-sectional side view of the modified form of the anti-removal member taken along the line 7—7 of FIG. 6, where the anti-removal member is in a closed position.

FIGS. 6–7 show another embodiment of the anti-removal member 80. An outwardly extending lip 100 projects from the top side 89 of each said plane 82, 84, 86, 88, 92, 94, 96, 98 at an angle of approximately forty-five degrees. The lip 100 facilitates the scooping of dirt into the anti-removal member 80, thereby expanding the member 80 into the open position shown in FIG. 5 when the shaft 124 is moved in an upward direction.

Figure 8:
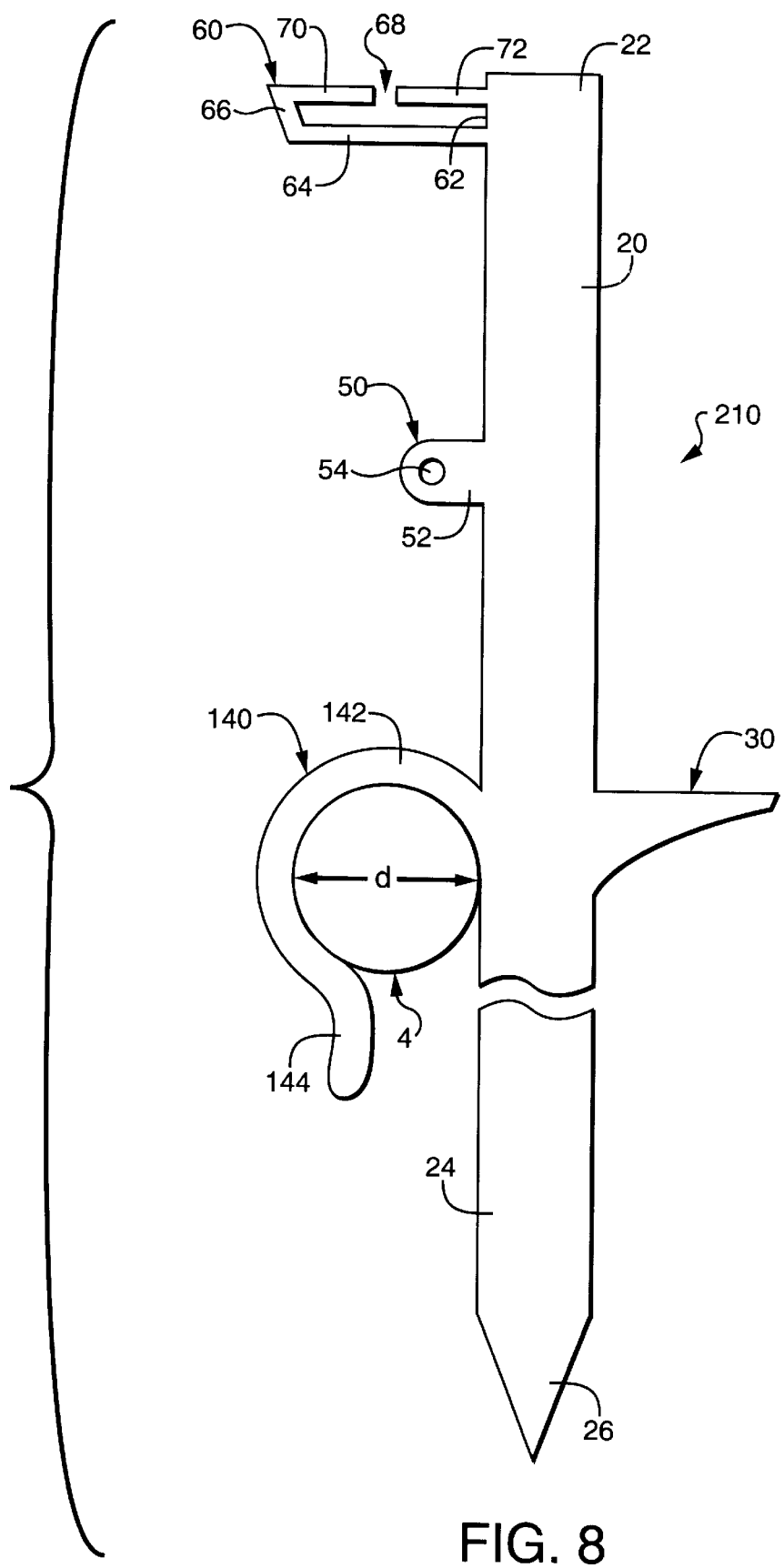
FIG. 8 a fragmentary side elevational view of a modified form of the stake of the present invention where the pipe engaging member has a modified form designed to support and secure the pipe at a distance above the base fill.

FIG. 8 demonstrates another embodiment of the present invention. The stake 210 has a longitudinal shaft 20 which has a top end 22, a bottom end 24, and a tapered point 26 extending from the bottom end 24. A curvilinear-shaped pipe engaging member 140 extends laterally from the shaft 20 towards the bottom end 24 of the shaft 20 forming a pipe support hook. The curvilinear-shaped pipe engaging member 140 has a first end 142 having an arched shape, a second end 144 having an inwardly arched shape, and a preferred diameter "d" of approximately six inches or less to accommodate pipes 4 with a similar diameter. This embodiment can be manufactured with varying diameters to accommodate pipes of different sizes. A pipe 4 is inserted into and received by the pipe engaging member 140 between the second end 144 of the pipe engaging member 140 and the bottom end 24 of the shaft 20. The arched shape of the first end 142 of the pipe engaging member 140 embraces the pipe 4 and prevents upward and sideways movement of the pipe 4. The inwardly arched shape of the second end 144 supports the pipe 4 and holds the pipe 4 suspended about the base fill 6, whose surface may not be level at the time of installation of the pipe 4 in the stake 210. An integral flange 30 extends laterally from the shaft 20 near the bottom end 24. A first receptacle 50 extends laterally from the shaft 20 near the top end 22 between the pipe engaging member 140 and a second receptacle 60 at a distance of approximately six inches from the pipe engaging member 140. The first receptacle 50, has a receiving member 52 with a closed wall opening 54. The first receptacle 50 is designed to receive a tracer wire 8 through and within the closed wall opening 54 contained in the receiving member 52. The second receptacle 60 extends from the shaft 20 above both the pipe engaging member 140 and the first receptacle 50, approximately six inches above the first receptacle 50. The second receptacle 60 is a roughly C shaped member with a bottom 62, a back 64, a top 66, a slotted opening 68, a first arm 70, and second arm 72. The second receptacle 60 can receive a caution tape 9 through the slotted opening 68. The bottom 62, back 64, top 66, first arm 70, and second arm 72 of the second receptacle 60 then support and secure the caution tape 9 at a distance spaced above the first receptacle 50.

Figure 9:
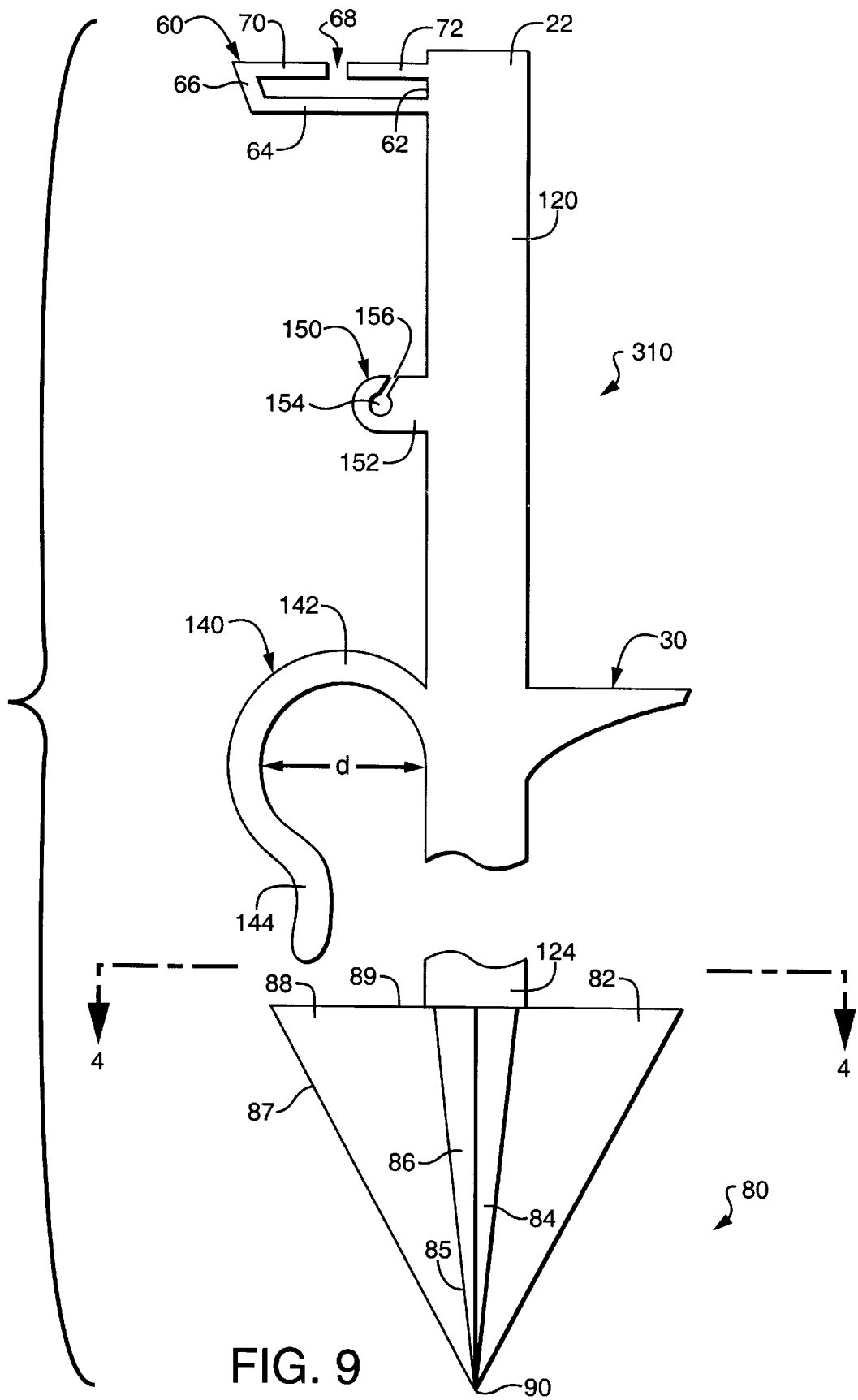
FIG. 9 is a preferred embodiment and is a fragmentary side elevational view of a modified form of the stake disclosed in FIG. 8, where an anti-removal member extends from the shaft of the stake.

FIG. 9 demonstrates the preferred embodiment of the present invention. Base fill 6 at the bottom of a trench 2 is often not uniformly level along the length of the trench 2, making installation of the pipe 4 difficult. The inventor prefers this embodiment because the pipe engaging member 140 is designed to receive, confine and support a pipe 4 above the base fill 6, thereby eliminating the problems presented by uneven base fill 6. Additional fill 6 can then be added below, around, and above the pipe 4 after the pipe 4 has been positioned and secured by the stake 310. The stake 310 has a longitudinal shaft 120 which has a top end 22, and a bottom end 124. A curvilinear-shaped pipe engaging member 140 extends laterally from the shaft 120 towards the bottom end 124 of the shaft 120 forming a pipe support hook. The curvilinear-shaped pipe engaging member 140 has a first end 142 having an arched shape, a second end 144 having an inwardly arched shape, and a preferred diameter "d" of approximately six inches or less to accommodate pipes 4 with a similar diameter. This embodiment can be manufactured with varying diameters to accommodate pipes of different sizes. The arched shape of the first end 142 of the pipe engaging member 140 embraces the pipe 4 and prevents upward and sideways movement of the pipe 4. The inwardly arched shape of the second end 144 supports the pipe 4 and holds the pipe 4 suspended about the base fill 6. An integral flange 30 extends laterally from the shaft 120 near the bottom end 124. A first receptacle 150 extends laterally from the shaft 120 near the top end 22 at a distance of approximately six inches from the pipe engaging member 140. The first receptacle 150 has a receiving member 152 with an open wall opening 154, which extends laterally from said shaft 120 between the pipe engaging member 140 and a second receptacle 60. The first receptacle 150 is designed to receive a tracer wire 8 through and within the open wall opening 154 through slot 156 contained in the receiving member 152. The second receptacle 60 extends laterally from the shaft 120 above the pipe engaging member 140 and the first receptacle 150. The second receptacle 60 is a roughly C shaped member with a bottom 62, a back 64, a top 66, a slotted opening 68, a first arm 70, and second arm 72. The second receptacle 60 can receive a caution tape 9 through the slotted opening 68. The bottom 62, back 64, top 66, first arm 70, and second arm 72 of the second receptacle 60 then support and secure the caution tape 9 at a distance spaced above the first receptacle 50. An integral anti-removal member 80, as also shown in FIGS. 3–5, extends from the bottom end 124 of the shaft 120. The anti-removal member 80 contains a multiplicity of hinged, three-sided planes 82, 84, 86, 88, 92, 94, 96, 98, which have a bottom portion 90, a top side 89, a left side 87, and a right side 85. The bottom portion 90 extends from the shaft 120, and the left side 87 of each plane 82, 84, 86, 88, 92, 94, 96, 98 is hinged to the right side 85 of another plane 82, 84, 86, 88, 92, 94, 96, 98. This design allows the anti-removal member 80 to expand and contract in size upon movement of the hinged planes 82, 84, 86, 88, 92, 94, 96, 98. The shapes of the planes 82, 84, 86, 88, 92, 94, 96, 98 and the orientation of the anti-removal member 80 on the bottom end 124 of the shaft 120 can be varied to provide adequate clearance for the underground pipes 4 during installation.

Figure 10:
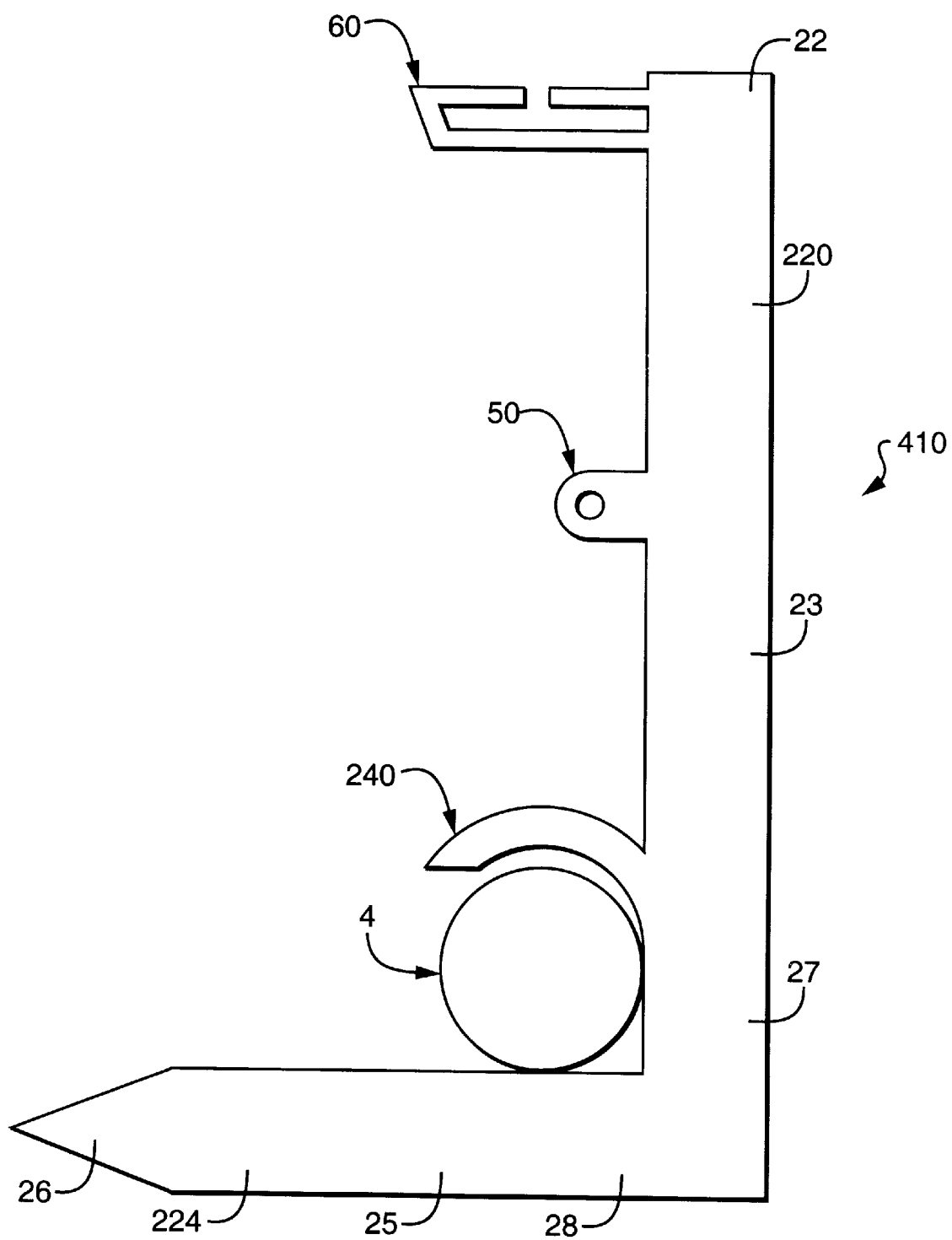
FIG. 10 is a side elevational view of another modified form of the stake where the shaft of the stake supports and secures the pipe at a distance above the base of the trench.

FIG. 10 demonstrates an additional embodiment of the present invention. This embodiment allows the stake 410 to be installed into the side of a trench 2 at a level above the bottom of the trench 2. Installation of the stake 410 in the side of the trench 2 allows the pipe 4 to be positioned in the trench 2 without the need for base fill 6 to be placed in the trench 2. Often, pipes or cables for other utilities, such as water or electric, may also be installed in the trench concurrently with the gas pipe 4. Installation of the stake 410 in the side of the trench 2 allows the gas pipe 4, tracer wire 8, caution tape 9, and additional utilities to all be placed in position before the trench 2 is filled. The stake 410 has a shaft 220 having a vertical leg 23 and a horizontal leg 25. The vertical leg 23 has a top end 22 and a bottom end 27, and the horizontal leg 25 has a first end 224, a second end 28, and a tapered point 26 extending from the first end 224. The second end 28 of the horizontal leg 25 and the bottom end 27 of the vertical leg 23 are joined at an angle approximating ninety degrees. The tapered point 26 of the horizontal leg 25 is designed to facilitate insertion of the first end 224 of the horizontal leg 25 into the hard ground 7 in the side of the trench 2. Pressure can be asserted at the bottom end 27 of the vertical leg 23 and along the vertical leg 23 to insert the first end 224 of the horizontal leg 25 into side of the trench 2. A pipe engaging member 240 extends laterally from the shaft 220 towards the bottom end 27 of the vertical leg 23. The pipe 4 is positioned above the second end 28 of the horizontal leg 25, next to the bottom end 27 of the vertical leg 23, and below the pipe engaging member 240, which is only of a sufficient length and shape to restrict movement of the pipe 4 in an upward direction. A first receptacle 50 extends laterally from the shaft 220 near the top end 22 of the vertical leg 23 between the pipe engaging member 240 and a second receptacle 60 at a distance of approximately six inches from the pipe engaging member 240. The first receptacle 50 has a receiving member 52 with a closed wall opening 54. The first receptacle 50 is designed to receive a tracer wire 8 through and within the closed wall opening 54 contained in the receiving member 52. The second receptacle 60 extends from the shaft 220 above both the pipe engaging member 240 and the first receptacle 50, approximately six inches above the first receptacle 50. The second receptacle 60 is a roughly C shaped member with a bottom 62, a back 64, a top 66, a slotted opening 68, a first arm 70, and second arm 72. The second receptacle 60 can receive a caution tape 9 through the slotted opening 68. The bottom 62, back 64, top 66, first arm 70, and second arm 72 of the second receptacle 60 then support and secure the caution tape 9 at a distance spaced above the first receptacle 50.

Ideally, the stakes 10, 110, 210, 310, 410, should be made of a nonmetallic polymer such as polyethylene or polyvinyl chloride for convenience, low cost, lightweight and nonreactivity. It is preferable that the stakes 10, 110, 210, 310, 410 be composed of the same material as the pipe 4 to ensure nonreactivity between the stakes 10, 110, 210, 310, 410 and the pipe 4.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A stake for use underground, comprising:
   a) a longitudinal shaft having a top end and a bottom end;
   b) a pipe engaging member extending laterally from said shaft at a location toward said bottom end; and
   c) at least one receptacle extending from said shaft at a location toward said top end and spaced from said pipe engaging member, where said at least one receptacle is a C shaped member having a first arm, a second arm and a slotted opening therebetween on an upper side of said C shaped member.

2. The stake as recited in claim 1, where said at least one receptacle includes an additional receptacle.

3. The stake as recited in claim 2, where said additional receptacle is a receiving member with a closed wall opening.

4. The stake as recited in claim 2, where said additional receptacle is a receiving member with a slotted opening.

5. The stake as recited in claim 2, where said first receptacle is a receiving member with a closed wall opening, which extends from said shaft at a location between said pipe engaging member and said second receptacle.

6. The stake as recited in claim 5, further comprising a flange extending laterally from said shaft at a location toward said bottom end.

7. The stake as recited in claim 2, where said additional receptacle is a receiving member with a slotted opening, which extends from said shaft at a location between said pipe engaging member and said C shaped member.

8. The stake as recited in claim 1, where said pipe engaging member has an arched shape and a diameter which generally corresponds to a tube diameter of a tube shaped object restrained by said pipe engaging member.

9. The stake as recited in claim 1, where said stake is composed of a material which corresponds to a material which composes a tube shaped object restrained by said pipe engaging member.

10. The stake as recited in claim 9, where said stake is composed of a plastic material selected from a group consisting of polyethylene and polyvinyl chloride.

11. The stake as recited in claim 1, further comprising a flange extending laterally from said shaft at a location toward said bottom end.

12. The stake as recited in claim 1, where said bottom end of said stake has a pointed end.

13. The stake as recited in claim 1, where said pipe engaging member has a curvilinear shape, with a first end having an arched shape, a second end having an inwardly arched shape, and a diameter which generally corresponds to a tube diameter of a tube shaped object restrained by said pipe engaging member.

14. A stake, comprising:
 a) a shaft having a vertical leg and a horizontal leg, where said vertical leg has a top end and a bottom end, said horizontal leg has a first end and a second end, and said second end of said horizontal leg and said bottom end of said vertical leg are joined at an angle approximating ninety degrees; and
 b) at least one receptacle extending from said shaft at a location toward said top end of said vertical leg.

15. The stake as recited in claim 14, further comprising a pipe engaging member extending laterally from said vertical leg at a location toward said bottom end and spaced from said at least one receptacle.

16. A stake, comprising:
 a) a longitudinal shaft having a top end and a bottom end;
 b) a pipe engaging member extending laterally from said shaft at a location toward said bottom end;
 c) at least one receptacle extending from said shaft at a location toward said top end and spaced from said pipe engaging member; and
 d) an anti-removal member extending at a location from said bottom end of said shaft where said member contains a multiplicity of hinged, three-sided, planes where each of said planes has a bottom portion, a top side, a left side, and a right side, said bottom portion of each of said planes extending from said shaft, and said left side of each of said planes being hinged to said right side of another of said planes allowing said member to expand and contract in size upon movement of said planes.

17. The stake as recited in claim 16, where said at least one receptacle includes a first receptacle and a second receptacle.

18. The stake as recited in claim 17, where said first receptacle is a receiving member with a closed wall opening, which extends from said shaft at a location between said pipe engaging member and said second receptacle.

19. The stake as recited in claim 18, where said second receptacle is a C shaped member with a slotted opening.

20. The stake as recited in claim 19, further comprising a flange extending laterally from said shaft at a location toward said bottom end.

21. The stake as recited in claim 19, where an outwardly extending lip projects upwardly from said top portion of each of said planes at an angle of approximately forty-five degrees.

22. The stake as recited in claim 16, where said pipe engaging member has a curvilinear shape, with a first end having an arched shape, a second end having an inwardly arched shape, and a diameter which generally corresponds to a tube diameter of a tube shaped object restrained by said pipe engaging member.

23. The stake as recited in claim 16, where an outwardly extending lip projects from said top side of each of said planes at an angle of approximately forty-five degrees.

* * * * *